United States Patent
Coons et al.

(10) Patent No.: US 8,659,185 B2
(45) Date of Patent: Feb. 25, 2014

(54) METHOD AND APPARATUS FOR AN ELECTRICAL BUS LEVELING UNIT

(75) Inventors: Terry L. Coons, Troy, OH (US); Steve Toothman, Mukiteo, WA (US)

(73) Assignee: General Electric Company, Schenectady, NY (US)

( * ) Notice: Subject to any disclaimer, the term of this patent is extended or adjusted under 35 U.S.C. 154(b) by 1364 days.

(21) Appl. No.: 12/240,426

(22) Filed: Sep. 29, 2008

(65) Prior Publication Data
US 2010/0078938 A1 Apr. 1, 2010

(51) Int. Cl.
*H02P 9/10* (2006.01)

(52) U.S. Cl.
USPC .................................. 307/44; 307/48; 307/59

(58) Field of Classification Search
USPC .............................. 307/44–46, 48, 59, 64–67
See application file for complete search history.

(56) References Cited

U.S. PATENT DOCUMENTS

| | | | | |
|---|---|---|---|---|
| 4,843,533 A * | 6/1989 | Roof et al. | | 363/55 |
| 5,814,954 A * | 9/1998 | Suzuki et al. | | 318/376 |
| 5,914,542 A | 6/1999 | Weimer et al. | | |
| 5,982,156 A | 11/1999 | Weimer et al. | | |
| 6,316,841 B1 * | 11/2001 | Weber | | 290/4 R |
| 6,657,321 B2 * | 12/2003 | Sinha | | 307/68 |
| 6,850,426 B2 | 2/2005 | Kojori et al. | | |
| 7,327,113 B2 | 2/2008 | Steigerwald et al. | | |
| 7,656,056 B2 * | 2/2010 | Brosig et al. | | 307/10.1 |
| 7,986,057 B2 * | 7/2011 | Ganev et al. | | 307/45 |
| 2002/0070557 A1 | 6/2002 | Geis | | |
| 2002/0080633 A1 | 6/2002 | Kang | | |
| 2003/0007369 A1 | 1/2003 | Gilbreth et al. | | |
| 2005/0049754 A1 | 3/2005 | Ogawa et al. | | |
| 2006/0059937 A1 * | 3/2006 | Perkins et al. | | 62/259.2 |
| 2006/0103341 A1 | 5/2006 | Steigerwald et al. | | |
| 2008/0094019 A1 | 4/2008 | Steigerwald et al. | | |
| 2010/0264724 A1 * | 10/2010 | Nelson et al. | | 307/9.1 |

* cited by examiner

*Primary Examiner* — Fritz M Fleming
(74) *Attorney, Agent, or Firm* — Matthew P. Hayden; Armstrong Teasdale LLP

(57) ABSTRACT

A method and apparatus for an electrical bus leveling unit are provided. The electrical bus leveling unit includes a first power supply configured to generate electrical energy having a first set of electrical parameters and a power converter electrically coupled to said power supply. The power converter is configured to be coupled to an electrical bus couplable to a second power supply. The electrical bus leveling unit also includes a controller including a processor that is communicatively coupled to the power supply and the power converter The controller is configured to receive information relating to the operation of the electrical bus from a plurality of sensors, control an output of at least one of the power supply and the power converter to transfer electrical energy to the electrical bus when the second set of electrical parameters on the electrical bus is outside a predetermined range.

19 Claims, 2 Drawing Sheets

METHOD AND APPARATUS FOR AN ELECTRICAL BUS LEVELING UNIT

STATEMENT REGARDING FEDERALLY SPONSORED RESEARCH & DEVELOPMENT

The U.S. Government has certain rights in this invention as provided for by the terms of Contract No. F33615-01-C-2168.

BACKGROUND OF THE INVENTION

This invention relates generally to power systems and, more particularly, to a method and apparatus of suppressing electrical transients on electrical buses.

At least some known power systems include equipment that when energized, induce a momentary spike in the electrical parameters on the electrical bus or buses of the power system. On More Electric Aircraft (MEA), power transients due to the normal operation of electrically powered actuators cause the main electrical bus voltage to exceed the voltage limits specified in applicable design standards. Such excursions on a main bus voltage may result in an upset of other electrical equipment receiving power from the bus, for example, avionics.

Some known solutions for handling the aircraft electrical bus voltage excursions require the use of either large banks of batteries or banks of capacitors. These solutions have practical limitations due to weight that could exceed 400 pounds (181.44 kg), performance limitations, maintenance issues, and undesirable failure modes.

BRIEF DESCRIPTION OF THE INVENTION

In one embodiment, an electrical bus leveling unit includes a first power supply configured to generate electrical energy having a first set of electrical parameters and a power converter electrically coupled to the power supply. The power converter is configured to convert the electrical energy having the first set of electrical parameters into an electrical energy having a second set of electrical parameters. The power converter is configured to be coupled to an electrical bus couplable to a second power supply. The second power supply is configured to operate with the second set of electrical parameters and the electrical bus being subject to experiencing relatively short term power transients due to the operation of equipment coupled to the electrical bus. The electrical bus leveling unit also includes a controller including a processor, communicatively coupled to the power supply and the power converter. The controller is configured to receive information relating to the operation of the electrical bus from a plurality of sensors and control an output of at least one of the power supply and the power converter to transfer electrical energy to the electrical bus when the second set of electrical parameters on the electrical bus is outside a predetermined range.

In another embodiment, a method of controlling an electrical bus includes supplying electrical energy from a first electrical energy source to the electrical bus during normal operations, wherein a first set of electrical parameters, including a voltage, on the electrical bus is maintained within a predetermined normal operating range by the first electrical energy source during normal operation. The method also includes determining a transient event on the electrical bus wherein the transient event is defined by a spike in at least one of the first set of electrical parameters on the electrical bus. The method further includes transferring energy to the electrical bus from a second electrical energy source if the transient reduced the amount of energy on the electrical bus such that the first set of electrical parameters on the electrical bus is returned to within the predetermined normal operating range by the second electrical energy source during the transient event. The method also includes transferring energy from the electrical bus to an energy sink if the transient increased the amount of energy on the electrical bus such that the first set of electrical parameters on the electrical bus is returned to within the predetermined normal operating range by the energy sink during the transient event.

In yet another embodiment, an electrical bus leveling unit that is couplable to an electrical bus for suppressing electrical transients on the electrical bus includes a turbine generator configured to generate electrical energy having a first set of electrical parameters during normal operation of the electrical bus, the turbine generator configured to convert kinetic energy stored in a rotating rotor of the turbine generator to supply electrical energy to the electrical bus during transient operation of the electrical bus. The electrical bus leveling unit also includes a controller including a processor, communicatively coupled to the turbine generator, the controller configured to control the electrical output of the turbine generator such that the turbine generator supplies approximately zero net energy to the electrical bus during normal operation.

BRIEF DESCRIPTION OF THE DRAWINGS

FIG. 1 is a schematic diagram of an electrical bus leveling unit (EBLU) in accordance with an exemplary embodiment of the present invention; and FIG. 2 is a schematic block diagram of an optional energy absorption mode to the EBLU shown in FIG. 1.

DETAILED DESCRIPTION OF THE INVENTION

The following detailed description illustrates embodiments of the invention by way of example and not by way of limitation. It is contemplated that the invention has general application to stabilizing electrical bus voltage, during transient conditions in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
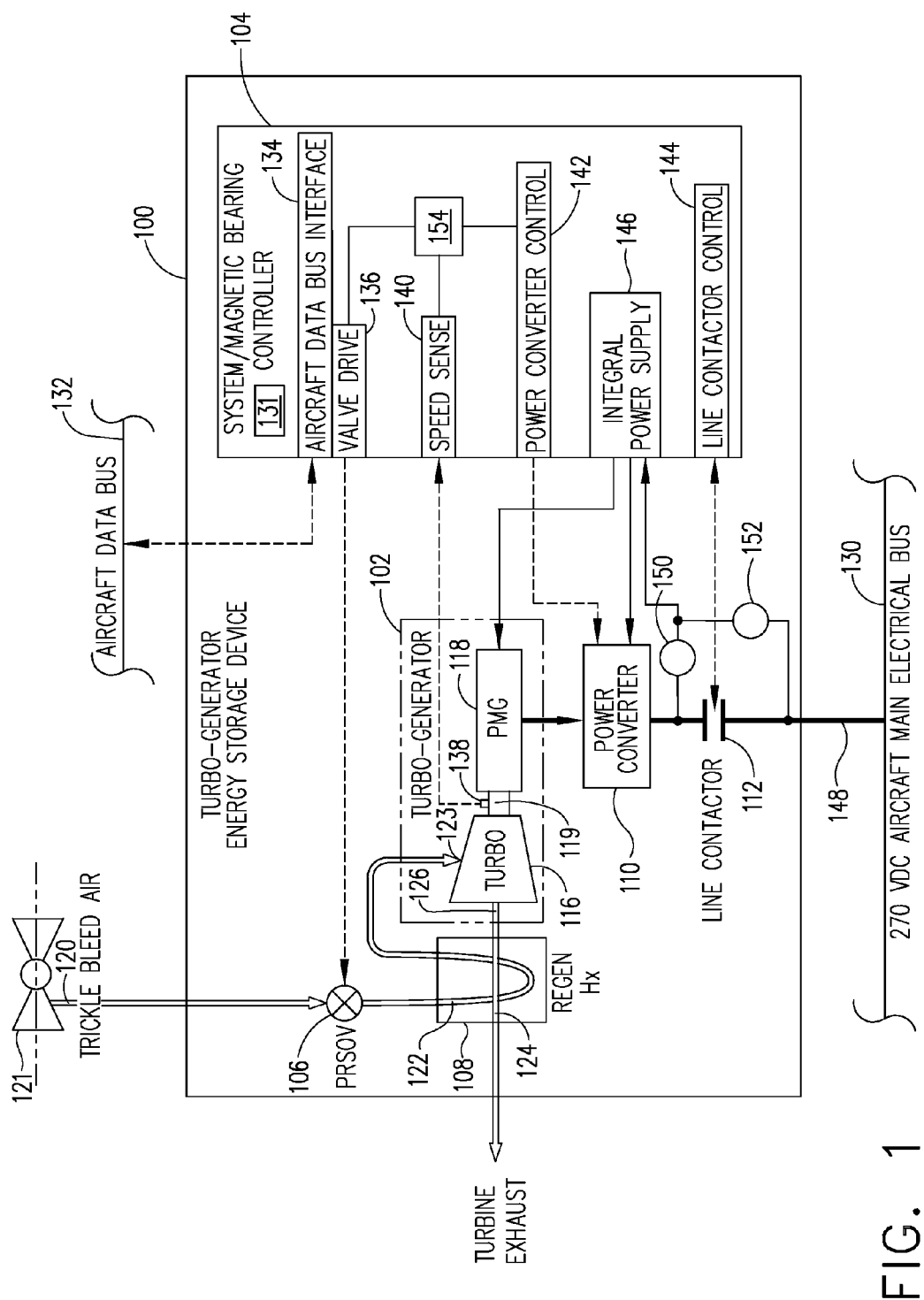
FIGS. 1 and 2 show exemplary embodiments of the method and apparatus described herein.

FIG. 1 is a schematic diagram of an electrical bus leveling unit (EBLU) 100 in accordance with an exemplary embodiment of the present invention. In the exemplary embodiment, EBLU 100 includes a magnetically levitated turbo-generator (T-G) 102, a system/magnetic bearing controller (S/MBC) 104, a pressure regulating shut off valve (PRSOV) 106, a regenerative heat exchanger 108, a power converter 110 for example, but not limited to a bi-directional power converter or an AC to DC converter, a line contactor 112. T-G 102 includes a compressed air-powered turbine 116 coupled to a permanent magnet generator (PMG) 118 through a shaft 119. T-G 102 includes a magnetically levitated shaft system 103 including magnetic bearings 105 controlled by S/MBC 104. The frictional losses are relatively low compared to other bearing systems. The use of magnetic bearings enhances the efficiency and response time of electrical energy extraction from the rotating inertia of T-G 102. Turbine 116 is coupled in flow communication to a source of compressed air 120, for example, but not limited to bleed air from a gas turbine engine compressor 121. In the exemplary embodiment, a flow of compressed air is directed from the source of compressed air through PRSOV 106 and a first flow path 122 of regenerative heat exchanger 108 to an inlet 123 of turbine 116. PRSOV 106 is configured to modulate the flow of compressed air to control a rotating speed of turbine 116. Regenerative heat exchanger 108 is configured to transfer heat regeneratively from the relatively hotter compressed air from PRSOV 106 in first flow path 122 to a relatively cooler flow of expanded air in a second flow path 124 of regenerative heat exchanger 108 that has been expanded in turbine 116 and discharged from a turbine exhaust outlet 126. The flow of expanded air is channeled to ambient or to another process.

In the exemplary embodiment, PMG 118 is electrically coupled to an aircraft 270 Volt direct current (VDC) main electrical bus 130 through bi-directional power converter 110 and line contactor 112. PMG 118 is configured to generate electrical energy having a first set of electrical parameters such as but not limited to 115 Volt AC electrical power, during normal operation of electrical bus 130. Also during normal operation of electrical bus 130, a second set of electrical parameters of electrical bus 130 are maintained within a predetermined range by a source of electrical power separate from PMG 118. In an alternative embodiment, PMG 118 is coupled to any bus matched to the power capabilities of PMG 118. As described in more detail below, turbine generator 102 is configured to convert kinetic energy stored in a rotating rotor of turbine generator 102 to supply electrical energy to the electrical bus during transient operation of the electrical bus In the exemplary embodiment, S/MBC 104 includes a processor 131 programmed to perform the functions described herein. S/MBC 104 is communicatively coupled to an aircraft data bus 132 using a data bus interface 134. In an alternative embodiment, S/MBC 104 is communicatively coupled to other data buses that permit EBLU 100 and S/MBC 104 to function as described herein. S/MBC 104 is also communicatively coupled to PRSOV 106 through a valve drive 136, a shaft speed sensor 138 through a speed sense circuit 140, power converter 110 through a power converter control circuit 142, and to line contactor 112 through a line contactor control circuit 144. An integral power supply 146 is communicatively coupled to the Magnetic Bearings of PMG 118 and power converter 110. Integral power supply 146 is coupled to a transient power bus 148 through a first diode 150 between power converter 110 and line contactor 112 and through a second diode 152 between line contactor 112 and main electrical bus 130.

During operation EBLU 100 operates in either a stand-by (charge) mode or generator mode. In the stand-by mode EBLU 100 is "charged" by applying a small "trickle" amount of high temperature, high pressure, bleed air to the input of PRSOV 106. PRSOV 106 reduces and clamps the down stream air pressure to a predetermined set point. The hot bleed air then passes through regenerative heat exchanger 108 where it is pre-cooled by the expanded exhaust air exiting turbine exhaust outlet 126. The pre-cooled bleed air is applied to turbine inlet 123 and energy is removed by expanding it through turbine 116. With the energy removed from the bleed air, the air exiting turbine 116 is cooler and at a lower pressure than at turbine inlet 123. The cooled air passes through a second flow path 124 of regenerative heat exchanger 108, pre-cooling the bleed air entering turbine inlet 123 from PRSOV 106, prior to being exhausted to ambient. The energy that is removed from the bleed air is converted into rotational energy of the T-G shaft 119. In the exemplary embodiment, the electrical output of T-G 102 is approximately 115 Volts RMS, high frequency electric power. To maintain the energy balance of EBLU 100, S/MBC 104 senses a speed of shaft 119 and commands Power Converter 110, to convert an amount of the 115 Volt RMS, high frequency electric power to 270 VDC. Most of this energy is used by integral power supply 146 to provide conditioned power to the components of EBLU 100 and any excess power will be placed on main electrical bus 130. In an alternative embodiment, S/MBC 104 is configured to control the electrical output of turbine generator 102 such that the turbine generator supplies approximately zero net energy to the electrical bus during normal operation.

During a first load transient, when S/MBC 104 senses that a second set of electrical parameters of bus 130 is outside a predetermined range, EBLU 100 switches from the stand-by (charge) mode to the generator mode. An example of the second set of electrical parameters of bus 130 being outside the predetermined range includes, for example but not limited to, when a current in main electrical bus 130 increase above a predetermined maximum current threshold, and/or a bus voltage is reduced below a predetermined threshold. As used herein, a set of electrical parameters includes measurable parameters of the type, amount, and/or quality of the electrical power on an electrical bus. Exemplary parameters include but are not limited to a frequency, a current, a voltage, a current flow direction, and/or a change in time of any electrical parameter. In the generator mode, S/MBC 104 disables speed control loop 154 and the kinetic energy stored in the rotation of T-G 102 is converted into electrical power, conditioned by power converter 110, and then channeled onto main electrical bus 130. As a result of the energy conversion, the rotational speed of T-G 102 is reduced. When S/MBC 104 senses a current in main electrical bus 130 below a maximum current threshold, indicating the end of the load transient, S/MBC 104 switches back to stand-by mode and the bleed air returns the speed of T-G 102 back to its set design speed.

During a second load transient or during recovery from the first load transient it may be necessary to absorb an amount of excess energy from bus 130. Because power converter 110 is bi-directional excess energy on bus 130 is converted from DC power on bus 130 to AC power fed back to PMG 118. At least some of the AC power fed back to PMG 118 will be dissipated as $I^2R$ losses in the windings of PMG 118. Some of the AC power fed back to PMG 118 may tend to motor PMG 118, where the excess energy is dissipated in tending to accelerate a rotor of PMG 118.

Figure 2:
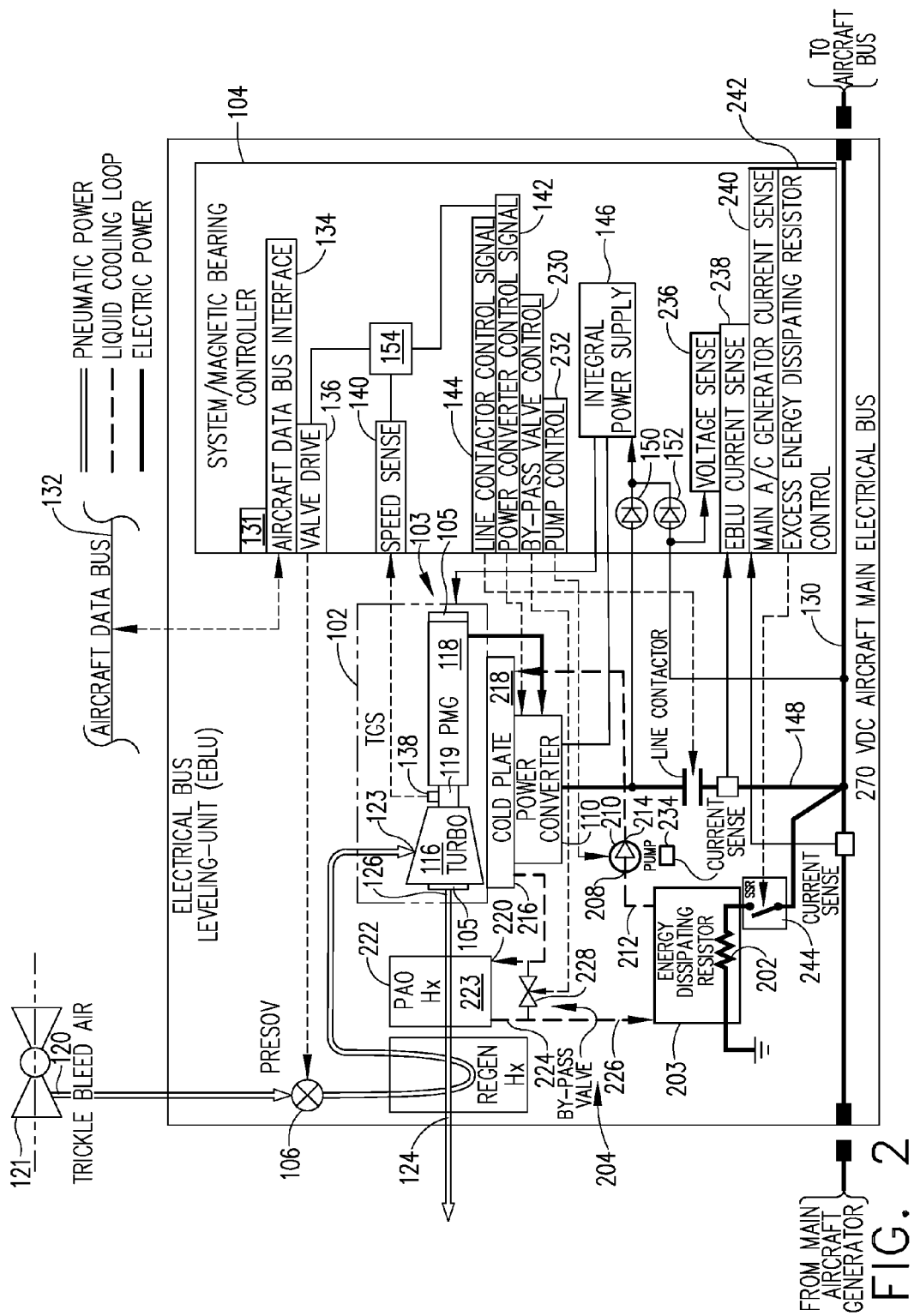

FIG. 2 is a schematic block diagram of an optional energy absorption mode to EBLU 100 (shown in FIG. 1). In the exemplary embodiment, the energy absorption mode can be added to EBLU 100 to address conditions where the voltage of bus 130 exceeds a predetermined maximum voltage limit. When S/MBC 104 senses the voltage of bus 130 is higher than the predetermined maximum threshold, EBLU 100 switches to the energy absorption mode. In the energy absorption mode, S/MBC 104 connects an energy sink or dissipative device 202 such as but not limited to an energy absorption resistor or a capacitor to main aircraft bus 130, the current flowing from bus 130 through for example, energy absorption resistor 202 dissipates excess energy on bus 130 by converting the excess energy to heat, which is then dissipated into a cooling loop 204. In an alternative embodiment, dissipative device comprises a capacitor or other storage device that absorbs energy from bus 130 and returns the energy to bus 130 during a recovery from the transient or dissipates the energy through for example, a resistor. In the exemplary embodiment, cooling loop 204 includes a resistor tank 206 in which resistor 202 is positioned. Resistor tank 206 is coupled in flow communication to a suction 208 of a circulating pump 210 through a conduit 212. A discharge 214 of pump 210 is coupled in flow communication with an inlet 216 of a heat exchanger or cooling jacket 218 surrounding PMG 118 such as but not limited to a cold plate. In the exemplary embodiment, cold plate 218 supplies cooling to T-G 102 and power converter 110. In this exemplary embodiment, because the excess energy on bus 130 is dissipated through resistor 202, power converter 100 may only be a uni-directional power converter, namely converting the AC power output of PMG 118 to DC power supplied to bus 130. An outlet of cold plate 218 is coupled in flow communication with an inlet 220 to a first flow path 222 through a heat exchanger 223. An outlet 224 of first flow path 222 is coupled in flow communication to an inlet 226 of resistor tank 206, completing the circuit of cooling loop 204. A heat exchanger bypass valve 228 is coupled in flow communication between inlet 220 and outlet 224 permitting a temperature of the flow of coolant through cooling loop 204 to be controlled. In the exemplary embodiment, cooling loop 204 uses a polyalphaolefin (PAO) liquid coolant. In various other embodiments, the cooling fluid comprises other compounds.

Bypass valve 228 is electrically coupled to a bypass valve control module 230 of S/MBC 104. Bypass valve control module 230 generates an output to heat exchanger bypass valve 228 to modulate a valve position of heat exchanger bypass valve 228 to control an amount of the flow of cooling fluid that passes through first flow path 222 and is subsequently cooled by the flow of turbine exhaust. Pump 210 is electrically coupled to a pump control module 232 of S/MBC 104. Pump 210 is rotatably coupled to a motor 234. In one embodiment, motor 234 is a single speed motor that is energized by pump control module 232. In an alternative embodiment, motor 234 is a multi-speed motor wherein each motor speed is selectably controlled by pump control module 232. In another alternative embodiment, motor 234 is a variable speed motor and pump control module 232 comprises a variable speed drive configured to modulate a speed of motor 234. Accordingly, pump 210 may be used to control a temperature of the flow of cooling fluid through cooling loop 204. S/MBC 104 also includes a voltage sense module 236 that is electrically coupled to bus 130. Voltage sense module 236 is configured to generate control signals related to the voltage present on bus 130. S/MBC 104 also includes a voltage sense module 236 that is electrically coupled to bus 130. Voltage sense module 236 is configured to generate control signals related to the voltage present on bus 130. S/MBC 104 also includes an EBLU current sense module 238 that is communicatively coupled to transient power bus 148. EBLU current sense module 238 is configured to generate control signals related to the current flowing through bus 148. S/MBC 104 also includes a main AC generator current sense module 240 that is communicatively coupled to power bus 130, main AC generator current sense module 240 is configured to generate control signals related to the current flowing through bus 130. An excess energy dissipating resistor control module 242 is communicatively coupled to a switching device 244, such as but not limited to a solid state relay that is configured to couple energy dissipating resistor 202 to bus 130.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is that during a load transient, the kinetic energy stored in the rotation of T-G 102 and shaft 119 is converted into electrical power and channeled to main electrical bus 130. As a result of the energy conversion, the rotational speed of T-G 102 and shaft 119 is reduced. After the load transient ends, the supply of bleed air returns the rotational speed of T-G 102 and shaft 119 back to its set design speed. If bus voltage exceeds maximum EBLU 100 connects energy absorption resistor 202 to main aircraft bus 130 resulting in the excess energy on main electrical bus 130 being converted to heat and dissipated into PAO Liquid Cooling Loop 204. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and apparatus of operating an electrical bus leveling unit provides a cost-effective and reliable means for stabilizing an electrical bus voltage, during transient conditions. More specifically, the methods and apparatus described herein facilitate storing energy during periods of stable bus operation and then either releasing or absorbing up to energy for periods of time during a transient condition resulting in stable continuous bus voltage. In addition, the above-described methods and apparatus facilitate reducing electrical load of the main electrical bus by not requiring electrical power from the main electrical bus for steady-state energy storage operation. As a result, the methods and apparatus described herein facilitate operating the power system in a cost-effective and reliable manner.

An exemplary method and apparatus for converting the kinetic energy stored in the rotation of a turbine generator shaft into electrical power and placed onto the main electrical bus or sinking energy from the electrical bus during a load transient are described above in detail. The apparatus illustrated is not limited to the specific embodiments described herein, but rather, components of each may be utilized independently and separately from other components described herein. Each system component can also be used in combination with other system components.

While the disclosure has been described in terms of various specific embodiments, it will be recognized that the disclosure can be practiced with modification within the spirit and scope of the claims.

What is claimed is:

1. An electrical bus leveling unit comprising:
   a first power supply configured to generate electrical energy having a first set of electrical parameters and to store kinetic energy, wherein said first power supply comprises a compressed air powered aircraft turbine generator;
   a power converter electrically coupled to said first power supply, said power converter configured to convert the electrical energy having the first set of electrical parameters into an electrical energy having a second set of electrical parameters, said power converter configured to to be coupled to a main aircraft electrical bus couplable to a second power supply, the second power supply configured to operate with the second set of electrical parameters and the aircraft electrical bus being subject to experiencing relatively short term power transients due to the operation of equipment coupled to the aircraft electrical bus, wherein said power converter is a bi-directional power converter configured to optionally supply electrical energy to the aircraft electrical bus or transfer electrical energy from the aircraft electrical bus during a power transient; and
   a controller, comprising a processor, communicatively coupled to said first power supply and said power converter, said controller configured to:
      receive information relating to the operation of the aircraft electrical bus from a plurality of sensors;
      control an output of at least one of the first power supply and the power converter by enabling the kinetic energy stored in the first power supply to be converted into electrical energy to transfer electrical energy to the aircraft electrical bus when the second set of electrical parameters on the aircraft electrical bus is outside a predetermined range.

2. An electrical bus leveling unit in accordance with claim 1 further comprising an energy sink electrically couplable to the aircraft electrical bus using a switching device, said controller configured to control the operation of the energy sink using the switching device.

3. An electrical bus leveling unit in accordance with claim 2 wherein said energy sink comprises a dissipative device.

4. An electrical bus leveling unit in accordance with claim 3 further comprising a circuit of cooling fluid configured to transfer heat from said dissipative device.

5. An electrical bus leveling unit in accordance with claim 2 wherein said energy sink comprises a storage device.

6. An electrical bus leveling unit in accordance with claim 1 wherein said first power supply comprises a turbine coupled in flow communication to a supply of compressed air.

7. An electrical bus leveling unit in accordance with claim 6 further comprising an energy sink electrically couplable to the aircraft electrical bus and a circuit of cooling fluid configured to transfer heat from said energy sink to an exhaust of said turbine through the circuit of cooling fluid.

8. A method of controlling an aircraft electrical bus comprising:
   supplying electrical energy from a first electrical energy source to the aircraft electrical bus during normal operations, wherein a first set of electrical parameters, including a voltage, on the aircraft electrical bus is maintained within a predetermined normal operating range by the first electrical energy source during normal operation, said first electrical energy source comprising a compressed air powered aircraft turbine generator;
   determining a transient event on the aircraft electrical bus wherein the transient event is defined by a spike in at least one of the first set of electrical parameters on the aircraft electrical bus;
   transferring energy to the aircraft electrical bus from a second electrical energy source that stores kinetic energy if the transient reduced the amount of energy on the aircraft electrical bus such that the first set of electrical parameters on the aircraft electrical bus is returned to within the predetermined normal operating range by the second electrical energy source during the transient event, wherein transferring energy to the aircraft electrical bus from the second electrical energy source comprises enabling the kinetic energy stored in the second electrical energy source to be converted into electrical energy; and
   transferring energy from the aircraft electrical bus to an energy sink if the transient increased the amount of energy on the aircraft electrical bus such that the first set of electrical parameters on the aircraft electrical bus is returned to within the predetermined normal operating range by the energy sink during the transient event, wherein transferring energy from the aircraft electrical bus to an energy sink comprises using a bi-directional power converter to optionally supply electrical energy to the aircraft electrical bus or transfer electrical energy from the aircraft electrical bus during transient operation.

9. A method in accordance with claim 8 wherein determining a transient event comprises determining a change in the first set of electrical parameters that corresponds to a change in the energy on the aircraft electrical bus equal to approximately 150kilowatts for 150 milliseconds.

10. A method in accordance with claim 8 wherein determining a transient event comprises determining a change in the first set of electrical parameters that corresponds to a change in the energy on the aircraft electrical bus equal to approximately 150kilowatts for 50 milliseconds.

11. A method in accordance with claim 8 wherein determining a transient event on the aircraft electrical bus comprises determining a spike in a voltage on the electrical bus.

12. A method in accordance with claim 8 wherein determining a transient event on the aircraft electrical bus comprises determining a spike in a current through the aircraft electrical bus.

13. A method in accordance with claim 8 wherein transferring energy to the aircraft electrical bus from the second electrical energy source comprises transferring energy to the aircraft electrical bus from a compressed air powered turbine generator.

14. A method in accordance with claim 8 wherein transferring energy to the aircraft electrical bus from the second electrical energy source comprises transferring energy to the aircraft electrical bus from a turbine generator using a the power converter.

15. A method in accordance with claim 8 wherein transferring energy from the aircraft electrical bus to an energy sink comprises transferring energy from the aircraft electrical bus to a resistor.

16. An electrical bus leveling unit couplable to an aircraft electrical bus for suppressing electrical transients on the aircraft electrical bus, said electrical bus leveling unit comprising:
   a compressed air powered aircraft turbine generator configured to generate electrical energy having a first set of electrical parameters and to store kinetic energy in a rotating rotor during normal operation of the aircraft electrical bus, said turbine generator configured to convert the kinetic energy stored in the rotating rotor of the turbine generator to supply electrical energy to the aircraft electrical bus during transient operation of the aircraft electrical bus;

a bi-directional power converter configured to optionally supply electrical energy to the aircraft electrical bus or transfer electrical energy from the aircraft electrical bus during transient operation; and a controller comprising a processor, communicatively coupled to said turbine generator, said controller configured to control the electrical output of the turbine generator such that the turbine generator supplies approximately zero net energy to the aircraft electrical bus during normal operation.

17. An electrical bus leveling unit in accordance with claim 16, wherein said aircraft turbine generator is a first power supply, said power converter electrically coupled to said first power supply, said power converter configured to convert the electrical energy having the first set of electrical parameters into an electrical energy having a second set of electrical parameters, said power converter configured to be coupled to an aircraft electrical bus couplable to a second power supply, the second power supply configured to operate with the second set of electrical parameters.

18. An electrical bus leveling unit in accordance with claim 16 further comprising a dissipative device electrically couplable to the aircraft electrical bus using a switching device, said controller configured to control the operation of the dissipative device using the switching device.

19. An electrical bus leveling unit in accordance with claim 18 further comprising a circuit of cooling fluid configured to transfer heat from said dissipative device.

* * * * *